Sept. 24, 1974  S. J. HENGELI  3,838,044
MAGNETIC FILTER AND METHOD OF FILTERING FERROMAGNETIC
AND OTHER PARAMAGNETIC PARTICULATE
CONTAMINANTS FROM FLUIDS
Filed Aug. 14, 1972

United States Patent Office 3,838,044
Patented Sept. 24, 1974

3,838,044
MAGNETIC FILTER AND METHOD OF FILTERING FERROMAGNETIC AND OTHER PARAMAGNETIC PARTICULATE CONTAMINANTS FROM FLUIDS
Steve J. Hengeli, 4075 Regal Ave.,
Brunswick, Ohio 44212
Filed Aug. 14, 1972, Ser. No. 280,252
Int. Cl. B01d 35/06
U.S. Cl. 210—42                    12 Claims

ABSTRACT OF THE DISCLOSURE

A magnetic filter for removing ferromagnetic and other paramagnetic particulate material from a fluid, having a rotatable toroid-shaped carrier with magnets disposed along the inner periphery of the toroid, a fluid passageway disposed near the inner periphery of the carrier having an opening permitting the transfer of ferromagnetic and other paramagnetic particulate material from the passageway to the inner peripheral surface of the magnet carrier. A second fluid passageway is disposed near another segment of the inner periphery of the carrier to receive ferromagnetic and other paramagnetic particulate material transferred to it from the carrier. A method of filtering is also disclosed.

---

This invention relates to the filtering art, and, more particularly, to magnetic filters.

The invention is particularly applicable to the removal of ferromagnetic and other paramagnetic particulate paramagnetic particulate contaminants from pickling acid, and will be described with specific reference thereto; however, it will be appreciated that the invention has broader implications and may be used advantageously for the removal of ferromagnetic particulate materials from liquids generally as well as from other fluids.

Enormous quantities of pickling acids, particularly sulphuric, hydrochloric and phosphoric acids, are used annually to clean, derust, etch and otherwise prepare ferrous metals for various industrial processes, for example machining, plating, drawing, stamping, and the like.

Pickling acids digest rust scale and flake which may be present on the surface of the ferrous metal itself. This leaves the metal with a clean matte surface which lends itself readily to further processing.

Cleaning of the metal of course contaminates the pickling acid. The more iron that becomes dissolved in the acid the weaker the acid becomes and the less efficient becomes the pickling operation. In general, it has been found that satisfactory pickling will take place with acid containing up to about 8 wt. percent dissolved iron. However, as the iron content increases it is necessary to add makeup acid, raise the operating temperature of the pickling solution from a normal range of about 150° F. to about 170° F., to a range of 170° F. to as high as 210° F., and lengthen the pickling time.

Once the dissolved iron content level in the pickling acid has reached 8 wt. percent, it is no longer economically feasible to continue to use the acid for pickling.

The conventional practice of disposing of spent acid is to drain the tank, cart the spent acid to a land fill or other dumping area, discharge the acid and then "kill" it with an alkaline material, for example lime.

An increasing scarcity in dumping areas for spent acid, ecological considerations, and the high labor and transportation costs involved in draining tanks and carting the spent acid to a dumping site have all contributed to making conventional practices unattractive. Consequently there is a need for improved equipment and methods treating pickling acid to extend its life and thereby reduce the amount of spent acid which must be discharged to the environment. The present invention is addressed to filling this need.

Experience in the field has shown that a 5,000 gallon tank of pickling acid can treat approximately 300,000 pounds of steel wire, using conventional techniques for maintaining pickling activity. As noted above these techniques include increasing the temperature of the pickling acid, adding makeup acid and lengthening the pickling time. It takes one week to process the 300,000 pounds of steel operating one eight hour shift a day for ten days. Thus, the 5,000 gallon tank in the service described must be emptied once every two weeks of operation.

It has also been noted that pickling tanks which treat ferrous metals covered with rust scale and flake must be serviced far more frequently than tanks which treat relatively rust-free ferrous metals. This is believed to be explained by the fact that the rust scale and flake brought into the tank on the surface of the ferrous metal being treated is washed off and left behind in the pickling tank after the ferrous metal is removed. While the acid can dissolve iron from the ferrous metal itself only for the short period of time the latter is immersed in the pickling acid, the rust scale and flake which is washed off the ferrous metal remains in the pickling tank until it is completely digested. Thus it is the rust scale and flake rather than the ferrous metal being treated which is the source of most of the iron which becomes dissolved in the pickling acid.

In recognition of this problem I have devised a method, and apparatus in the form of a magnetic filter, for removing rust scale, flake and loose iron particles which normally become awash in pickling acid. Removing these ferromagnetic and other paramagnetic particulate contaminants from the pickling acid results in the useful life of the acid being extended by many fold, its life expectancy under conventional operating conditions.

In accordance with one aspect of the invention there is provided a magnetic filter for removing ferromagnetic and other paramagnetic particulate material from a fluid containing the same, comprising a rotatable toroid-shaped magnet carrier, means for rotating the carrier, magnet means disposed circumferentially of the inner periphery of the toroid-shaped carrier, means dividing the open center of the toriod-shaped magnet carrier into two fluid passageways each adapted to direct the flow of fluid generally parallel to the axis of rotation of the toroid-shaped magnet carrier, and means providing communiction between each of the passageways and spaced portions of the inner periphery of the toroid-shaped magnet carrier. As the carrier rotates, ferromagnetic and other paramagnetic particulate material in the fluid in one of the passageways is transferred to the other passageway via travel along the inner periphery of the toroid-shaped magnet carrier.

In accordance with another aspect of the invention, there is provided a method of filtering ferromagnetic and other paramagnetic particulate contaminants from pickling acid which comprises removing a stream of contaminated pickling acid from a pickling tank, directing the stream through the magnetic field generated by magnet means disposed along the inner periphery of a rotating toroid-shaped magnet carrier whereby the contaminants are withdrawn from the stream and deposited upon the inner periphery of the magnet carrier, recycling decontaminated pickling acid to the pickling tank and purging ferromagnetic contaminants from the inner periphery of the magnet carrier into a fluid stream.

It is therefore an object of the present invention to provide a method and apparatus for extending the useful life of fluids such as pickling acids which are degraded by the presence of ferromagnetic and other paramagnetic particulate contaminants.

Another object of the invention is to provide a method and apparatus for filtering ferromagnetic and other paramagnetic particulate material from pickling acids and other fluids containing the same using magnetic means to effect the removal of the ferromagnetic and other paramagnetic particulate material.

Still another object of the invention is to provide an improved magnetic filter and an improved method of magnetically filtering ferromagnetic and other paramagnetic particulate material from a fluid such as a pickling acid containing the same.

These and other objects and advantages will become apparent from the following detailed description of the invention when read in conjunction with the accompanying drawings which illustrates preferred embodiments of the invention, and wherein.

Figure 1:
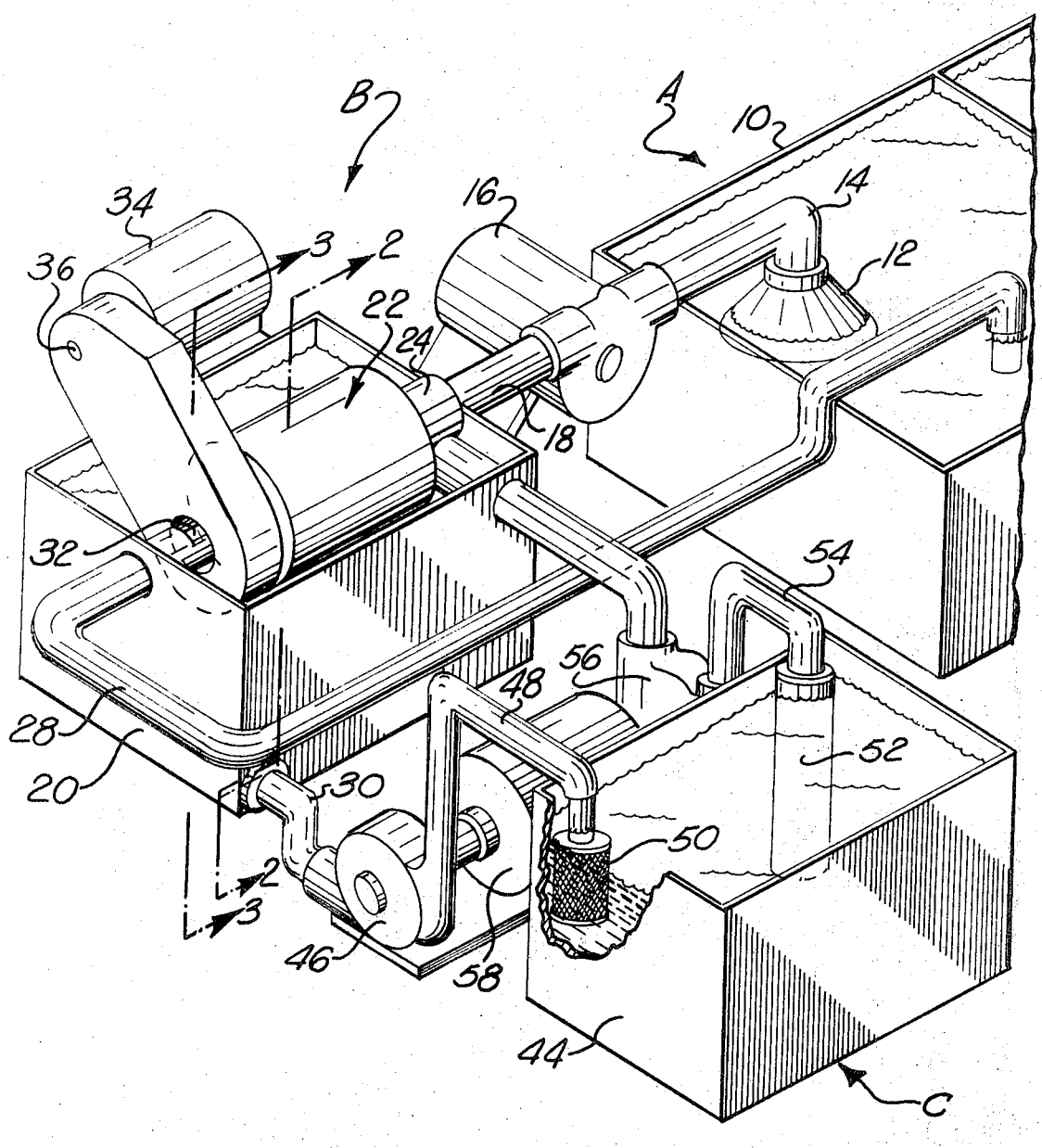
FIG. 1 is a schematic pictorial view of apparatus comprising a magnetic filter constructed in accordance with a preferred embodiment of the present invention.

Referring now to the drawings wherein the showings are for the purpose of illustrating preferred embodiments of the inventive apparatus and method only, and not for the purpose of limiting the same, FIG. 1 shows a general arrangement of parts including pickling tank assembly A, magnetic filter assembly B, and recovery assembly for ferromagnetic and other paramagnetic particles, C.

Pickling tank assembly A comprises tank 10; fan shaped collector 12 for drawing off ferromagnetic and other paramagnetic particles from the pickling liquid, pipe 14, pump 16 and pipe 18.

Magnetic filter assembly B comprises stripping tank 20, rotatable toroid-shaped magnet carrier 22, collar 24 adapted to receive both pipe 18 (carrying pickling liquid from tank 10) and pipe 26 (carrying stripping liquid from recovery assembly C), pipe 28 which carries decontaminated pickling liquid back to pickling tank 10, and pipe 30 which carried stripping liquid laden with ferromagnetic and other paramagnetic particles to recovery assembly C. Disposed between collar 24 and pipe 28 is conduit 32 extending axially through the open center of carrier 22, the function of which will be discussed presently.

Magnetic filter assembly B further comprises means for rotating carrier 22 which in the embodiment illustrated comprises (FIG. 3) motor 34 having shaft 36 to which is splined sprocket 38. Carrier 22 is provided with toothed annulus 40 which is connected through chain 42 to sprocket 38 for rotation of carrier 22.

Recovery assembly C comprises tank 44; on the inlet side, pump 46, pipe 48 and filter 50; and on the outlet side filter 52, pipe 54 and pump 56. Both pumps 46 and 56 are driven by motor 58.

The overall operation of the apparatus illustrated in FIG. 1 is as follows. Pickling liquid in tank 10 which is contaminated with ferromagnetic and other paramagnetic particulate material is drawn into fan-shaped collector 12 and pipe 14 by pump 16, and thence through pipe 18 and collar 24 into rotatable toroid-shaped magnet carrier 22.

Simultaneously stripping liquid is transported from tank 44 through filter 52 and pipe 54 by pump 56 and thence through pipe 26 and collar 24 into the interior of magnetic carrier 22. Decontaminated pickling liquid is recycled through pipe 28 back to the pickling tank 10 while stripping liquid laden with ferromagnetic and other paramagnetic particulate material is carried away through pipe 30, pump 46 and pipe 48 into tank 44 where the particulate matter is trapped in filter 50.

Figure 2:
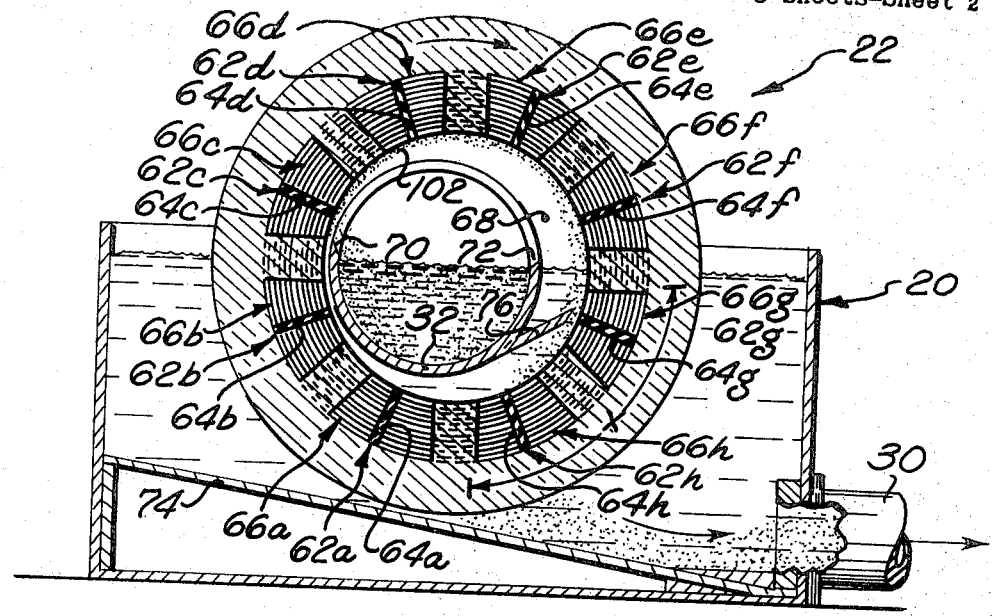
FIG. 2 is a schematic cross-sectional view taken generally along line 2—2 of FIG. 1.

As best illustrated in FIG. 2, carrier 22 is comprised of an outer iron peripheral portion 60, and magnet means disposed circumferentially of the inner periphery of the carrier and more specifically characterized by a plurality of electromagnets designated generally as 62a–62h inclusive, each comprised respectively of cores 64a–64h inclusive connected to outer iron peripheral portion 60, and coils 66a–66h inclusive.

Figure 3:
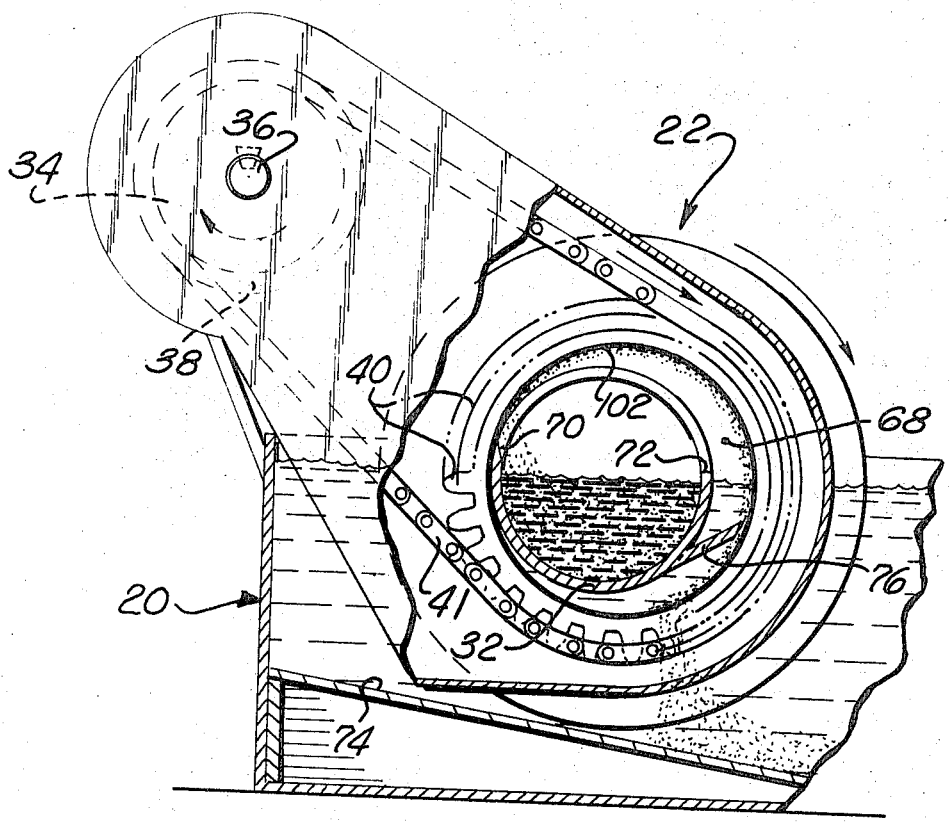
FIG. 3 is a schematic cross-sectional view taken generally along line 3—3 of FIG. 1.

With reference to FIGS. 2 and 3 it will be seen that conduit 32 is disposed eccentrically with respect to the axis of rotation of carrier 22 so that conduit 32, together with crescent shaped opening 68 define means dividing the open center of toroid-shaped magnet carrier 22 into two fluid passageways each adapted to direct the flow of fluid generally parallel to the axis of rotation of the carrier. Conduit 32 is provided with open wall portions 70, 72 extending generally the length of carrier 22. These openings constitute means providing communication between each of the two passageways, i.e., the interior of conduit 32 and crescent shaped opening 68, and spaced portions of the inner periphery of carrier 22.

With reference to FIGS. 2 and 3, as carrier 22 rotates clockwise as viewed in the drawings pickling liquid contaminated with ferromagnetic and other paramagnetic particulate material flows through conduit 32 toward the viewer. Magnets 62b and 62c, and to a lesser extent 62a, cause the ferromagnetic and other paramagnetic particulate material to be drawn toward the inner periphery of carrier 22. Rotation of the carrier causes the particulate material to "climb" the inner wall of conduit 32 and upon reaching open wall portion 70, to escape the confines of conduit 32 and become magnetically attached to the inner periphery of carrier 22 as for example to magnets 62d and 62e. In this manner ferromagnetic and other paramagnetic particulate material is transferred from the interior of conduit 32 into crescent shaped opening 68 through which stripping liquid travels, also toward the viewer. It will be appreciated that if desired the piping may be rearranged to permit the fluids in conduit 32 and crescent shaped opening 68 to flow in opposite directions.

In the arc of carrier 22 marked "x" (FIG. 2), occupied by electromagnets 62g, 62h, the magnets are demagnetized permitting the ferromagnetic and other paramagnetic particulate material to fall away from the inner periphery of the carrier and be swept away in the stream of stripping liquid passing through crescent shaped opening 68 toward the outlet to which pipe 30 is connected. To facilitate movement of the particulate material in the direction of the outlet, tank 20 is provided with false bottom 74 angled downwardly in the direction of the outlet and pipe 30.

It will be noted from the location of fan-shaped collector 12 near the top of tank 10 that the ferromagnetic and other paramagnetic particulate material is less dense than the pickling liquid, which is usually a fairly high density concentrated acid; while the outlet for the particulate material in tank 20 is located at the bottom, indicating that the particulate material is more dense than the stripping liquid. In general the stripping liquid will be an aqueous solution which is either buffered or rendered somewhat basic to effectively neutralize the acid carried over with the particulate material. It will be appreciated however that the stripping liquid may be a material having a higher density than the ferromagnetic and other paramagnetic particulate material in which event the outlet and pipe 30 will be positioned near the top of tank 20. In this event false bottom 74 can be eliminated.

If desired, means to assist the purging of the ferromagnetic and other paramagnetic material from the inner periphery of carrier 22 may be provided, and in the embodiment illustrated, such means takes the form of scraper 76. The structure of the scraper should be such as to provide minimum resistance to the fall of particulate material into the stream of stripping liquid. Thus the scraper should be a highly foraminous, nonmagnetizable material. Alternatively the scraper may comprise a nonmagnetizable blade extending lengthwise along the inner periphery of the carrier on widely spaced arms extending tangentially from the outer surface of conduit 32.

In the event permanent magnets are substituted for electromagnets, as the invention also contemplates, the function of the scraper becomes quite important since this is the principal way in which the ferromagnetic and other paramagnetic material is purged from the inner periphery of the carrier 22.

Figure 4:
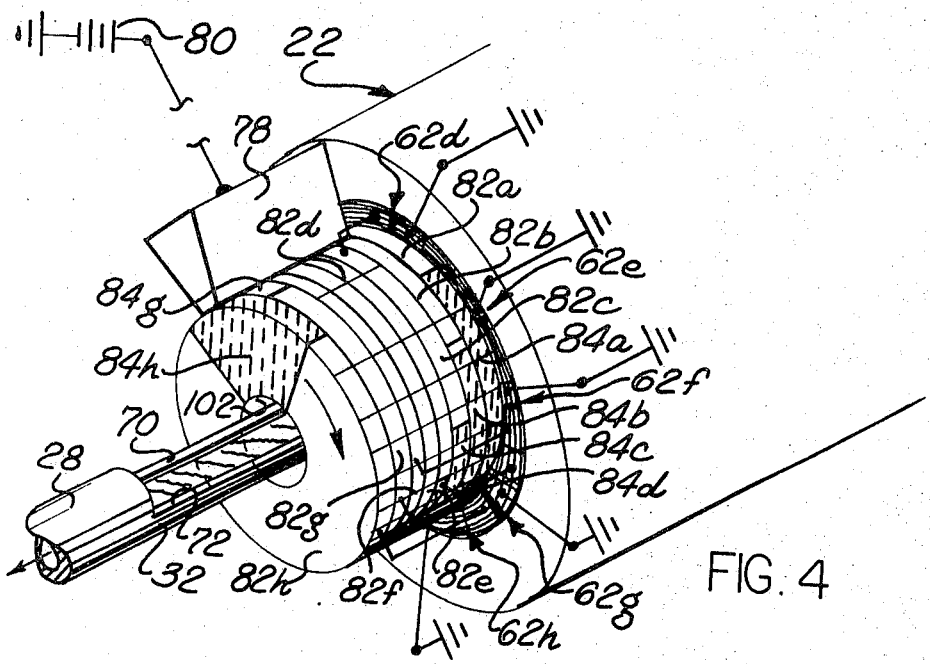
FIG. 4 is a schematic, pictorial fragmentary view of a portion of the magnetic filter showing the electrical connections for a preferred embodiment which uses electromagnets.

An example of means for de-energizing electromagnets 62a–62h inclusive is illustrated in FIG. 4 and comprises direct current source 80, which may be a battery or a rectifier, connected to stationary brush 78 which contacts a series of commutator rings 82a–82h inclusive, each of which is provided with a staggered nonconductive segment 84a–84h inclusive of which only 84a, 84b, 84c, 84d, 84g and 84h can be seen in the drawing. Segments 84e, 84f are on the backsides of rings 82e, 82f, respectively, and are therefore hidden from view.

Coils 66a–66h inclusive of electromagnets 62a–62h inclusive each has one end connected, respectively, to commutator rings 82a–82h respectively. Thus, one end of coil 66a is connected to commutator ring 82a; one end of coil 66b is connected to commutator ring 82b, and so forth. The other end of each coil is connected to ground.

Nonconductive segments 84a–84h inclusive are disposed in staggered relationship with respect to brush 78 so that as each of the electromagnets rotates through arc x (FIG. 2) the circuits between brush 78 and the various coils are opened by virtue of the brush contacting the nonconductive portion of the corresponding commutator rings. Comparing FIGS. 2 and 4 it will be seen that electromagnet 62h is passing out of the demagnetization zone as nonconductive segment 84h of commutator ring 82h is passing out from beneath brush 78. Similarly, electromagnet 64g is well into the demagnetization zone, and nonconductive segment 84g of commutator ring 82g is halfway through its travel beneath brush 78.

Figures 5, 6:
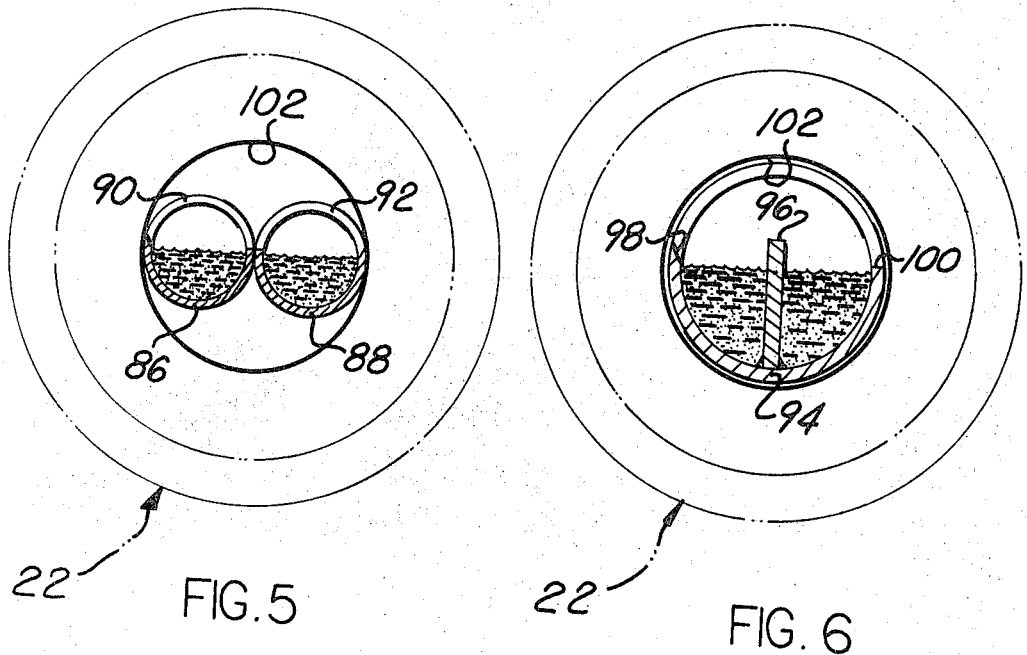
FIG. 5 is a schematic cross-sectional fragmentary view of a second embodiment of magnetic filter; and, FIG. 6 is a schematic cross-sectional fragmentary view of still another etmbodiment of magnetic filter.

FIGS. 5 and 6 depict alternative embodiments of the invention. FIG. 5 shows means dividing the open center of toroid-shaped magnet carrier 22 into two fluid passageways by means of a pair of conduits 86, 88 disposed eccentrically with respect to the axis of rotation of magnet carrier 22. In this configuration means providing communication between each of the passageways and spaced portions of the inner periphery of carrier 22 take the form of open wall portions 90, 92.

In FIG. 6 means for dividing the open center of toroid-shaped magnet carrier 22 into two fluid passageways takes the form of conduit 94 concentrically disposed with respect to the axis of rotation of carrier 22, having partition 96 therein. Means providing communication between each of the passageways and spaced portions of the inner periphery of the carrier are provided by open portions 98, 100.

In order to protect the electromagnets against attack by pickling acid, the inner periphery of carrier 22 is preferably provided with an acid resistant coating or covering 102, such as polytetrafluoroethylene, chlorinated polyethers, polyethylenes and polyvinyl chloride monomers and copolymers.

Other embodiments and modifications will readily suggest themselves to one having ordinary skill in the art. For example, in certain instances it may be desirable to vibrate conduit 32 or agitate the fluid contained therein to facilitate movement of the ferromagnetic and other paramagnetic particles in the direction of the inner periphery of carrier 22. Further, it may be desirable to pass the contaminated fluid past a plurality of magnet carriers, or recycle the fluid or a portion thereof a plurality of times past a single magnet carrier.

The invention has been described in sufficient detail to enable one of ordinary skill in the art to make and use the same.

Having thus described by invention I claim:

1. A magnetic filter assembly for removing ferromagnetic and other paramagnetic particulate material from a liquid containing the same, comprising
   a rotatable toroid-shaped magnet carrier,
   means for rotating said carrier,
   magnet means disposed circumferentially of the inner peripherey of said toroid-shaped carrier,
   means dividing the open center of the toroid-shaped magnet carrier into two discrete liquid conduits, each adapted to direct the flow of liquid generally parallel to the axis of rotation of the toroid-shaped magnet carrier and out of contact with said magnet means, and
   pump means causing liquid to flow through each of said conduits,
   means providing communication between each of said conduits and spaced portions of the inner periphery of said toroid-shaped magnet carrier
   whereby ferromagnetic and other paramagnetic particulate material in the liquid in one of said conduits is transferred to the liquid in the other of said conduits via travel along the inner periphery of said toroid-shaped magnet carrier as the latter rotates.

2. The magnetic filter assembly as defined in claim 1 wherein said dividing means comprises a pipe disposed eccentrically with respect to the axis of rotation of said magnet carrier and said communication providing means comprises an open portion in the well of said pipe.

3. The magnetic filter assembly as defined in claim 2 wherein said dividing means further comprises a second pipe disposed eccentrically with respect to the axis of rotation of said magnet carrier, and said communication providing means comprises an open portion in the wall of said second pipe.

4. The magnetic filter assembly as defined in claim 1 wherein said dividing means comprises a pipe disposed concentrically with respect to the axis of rotation of said magnet carrier, having a partition therein, and said communication providing means comprises an open portion in the wall of said pipe spanning both sides of said partition.

5. A magnetic filter assembly for removing ferromagnetic and other paramagnetic particulate material from a pickling liquid comprising,
   a filter tank,
   a rotatable toroid-shaped magnet carrier mounted for rotation in said tank,
   means for rotating said carrier,
   magnet means disposed along the inner periphery of said toroid-shaped carrier, and
   means for transporting pickling liquid to said toroid-shaped magnet carrier comprising a liquid conduit extending through the open center of said toroid-shaped carrier, said conduit having a first wall portion in close proximity to the inner periphery of said carrier, a second wall portion spaced from the inner periphery of said carrier providing communication between the inner periphery of said carrier and the interior of said filter tank, and an opening in the wall of said liquid conduit juxtaposed said first wall portion providing communication between the interior of said liquid conduit and the inner periphery of said carrier.

6. The magnetic filter assembly as defined in claim 5 wherein said magnet means comprises a plurality of electromagnets.

7. The magnetic filter assembly as defined in claim 5 further comprising a pickling liquid tank and means for circulating pickling liquid from said pickling liquid tank to said liquid conduit and back to said pickling liquid tank.

8. The magnetic filter assembly as defined in claim 7 further comprising a stripping tank and means for circulating stripping liquid from said stripping liquid tank through said filter tank and the space between the second wall portion of said liquid and the inner periphery of said carrier to carry away ferromagnetic and other paramagnetic particles removed from said liquid.

9. The magnetic filter assembly as defined in claim 8 wherein said magnet means comprises a plurality of electromagnets.

10. The magnetic filter assembly as defined in claim 9 further comprising means for de-energizing said electromagnets as they approach a position adjacent said second wall portion to facilitate the transport of ferromagnetic and other paramagnetic particles from the inner periphery of said carrier to said stripping liquid.

11. The magnetic filter assembly as defined in claim 5 further comprising scraper means positioned to purge ferromagnetic and other paramagnetic particles from the inner periphery of said toroid-shaped magnet carrier into the space between the second wall portion of said liquid conduit and said inner periphery.

12. A method of filtering ferromagnetic and other paramagnetic particulate contaminants from pickling acid which comprises
removing a liquid stream of contaminated pickling acid from a pickling tank,
directing said liquid stream through the magnetic field generated by magnet means disposed along the inner periphery of a rotating toroid-shaped magnet carrier whereby said contaminants are withdrawn from said stream and deposited upon the inner periphery of said magnet carrier,
recycling decontaminated pickling acid to said pickling tank, and
purging ferromagnetic and other paramagnetic contaminants from the inner periphery of said magnet carrier into a second liquid stream.

References Cited
UNITED STATES PATENTS

| | | | |
|---|---|---|---|
| 3,160,588 | 12/1964 | Alarie | 210—167 X |
| 3,375,925 | 4/1968 | Carpenter | 210—222 X |
| 3,443,991 | 5/1969 | Kremm | 134—3 |
| 3,696,032 | 10/1972 | Haensel | 210—42 |
| 2,398,725 | 4/1946 | Schutte | 210—42 |
| 3,341,021 | 9/1967 | Casson | 210—222 |
| 2,087,230 | 7/1937 | Bigeon et al. | 134—10 |

FOREIGN PATENTS

| | | | |
|---|---|---|---|
| 185,198 | 8/1922 | Great Britain | 209—221 |

THEODORE A. GRANGER, Primary Examiner

U.S. Cl. X.R.

134—10; 209—39, 221, 232; 210—167, 223